(12) United States Patent
Mollov (10) Patent No.: US 8,648,310 B2
(45) Date of Patent: Feb. 11, 2014

(54) INDIRECT X-RAY IMAGER HAVING SEMI-TRANSPARENT LAYERS

(75) Inventor: Ivan P. Mollov, Mountain View, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 338 days.

(21) Appl. No.: 13/008,851

(22) Filed: Jan. 18, 2011

(65) Prior Publication Data

US 2012/0181436 A1 Jul. 19, 2012

(51) Int. Cl.
*G01T 1/208* (2006.01)

(52) U.S. Cl.
USPC ..................... 250/366; 250/370.11

(58) Field of Classification Search
CPC ...................................................... G01T 1/2002
USPC ........................................... 250/366, 370.11
See application file for complete search history.

(56) References Cited

U.S. PATENT DOCUMENTS

| | | | | |
|---|---|---|---|---|
| 4,532,425 A | * | 7/1985 | Abileah et al. | 250/363.02 |
| 6,031,234 A | * | 2/2000 | Albagli et al. | 250/370.11 |
| 6,452,186 B1 | * | 9/2002 | Wieczorek et al. | 250/370.11 |

\* cited by examiner

*Primary Examiner* — Constantine Hannaher
(74) *Attorney, Agent, or Firm* — Blakely, Sokoloff, Taylor & Zafman LLP (57) ABSTRACT

An indirect x-ray imager including one or more semi-transparent layers that reduce lateral spreading of light produced by the scintillator layer. The semi-transparent layers may be one or more layers above and/or below the scintillator, which the light generated by the scintillator goes through prior to being received by an array of photosensors. The semi-transparent layers may have a light transparency that is proportional to the pixel pitch of the photosensor, and/or proportional to a thickness of the layers. The semi-transparent layers have a light transparency that allows a high percent of the light to be received across the thickness of the layer, but restrains most of the light from being received across a lateral distance of more than one pixel pitch. Other embodiments are also described and claimed.

26 Claims, 5 Drawing Sheets

INDIRECT X-RAY IMAGER HAVING SEMI-TRANSPARENT LAYERS

FIELD

Embodiments of the present invention are generally related to the field of indirect x-ray imagers and the use of semi-transparent layers to reduce lateral spreading of light produced by a scintillator layer of such an imager. Other embodiments are also described.

BACKGROUND

X-ray imagers (e.g., x-ray detectors) may be fabricated in many ways, and may serve many purposes. Imagers with a collector layer or array of detector elements are, for example, used in Computed Tomography (CT) scanners. Imagers know as "flat panel imagers" are increasingly used in the field of medical diagnostics, as universal imager components which can be employed in different application-specific X-ray devices.

Two types of flat panel imagers are "direct conversion" and "indirect conversion". In a direct conversion imager, an X-ray sensitive photoconductor is used to convert the X-rays directly into electrons. Since the photoconductor has low self-capacitance, charge collection capacitors can be fabricated by thin film techniques to act as a charge storage devices. In an indirect conversion imager, a scintillation layer above the light collector layer converts incident X-rays into photons of visible light that can then be converted into electrical signals by an array of light detector elements in the collector layer. Thus, an indirect converter has a scintillator of material in which incident X-radiation is converted into photons of visible light which can then be detected by an array of photosensors of the collector layer, disposed below the scintillator. Above and below the scintillator, there may be layers of a variety of materials. Some of the layers are used for protection, others are glue for mechanical support and others are for optical matching between light transferring surfaces of the layers. Optimally, light created by the scintillator would travel to the photodetector directly below where the light was created. However, as the scintillator emits the light into all directions (including "scattering" laterally within the layers), only a portion of the created photons will reach the photosensors directly below where the light was created.

Moreover, in some indirect imagers, a loss of light that is led away from the photosensors is avoided by a reflector or reflective layer, which is arranged above the scintillation layer and reflects the created light photons back into the scintillator and towards the photosensors. In this way the light yield, and with it the sensitivity and the signal-to-noise ratio of the imager can be increased. However, since the reflected light continues to scatter (including laterally within the layers), only a portion of this reflected light will reach the photosensors directly below where the light was created.

Thus, with indirect conversion there are negative influences on image sharpness (e.g., resolution) due to lateral light scatter in layers between the scintillator and the photosensors. In addition, there are also negative influences of the reflector on image sharpness due to the additional scattering of reflected photons in the imager layers (e.g., other than the scintillator) between the reflector and the collector's photosensors.

SUMMARY

Embodiments of the invention pertain to indirect x-ray imagers having semi-transparent layers which increase the spatial resolution of the imager. For instance, embodiments pertain to x-ray imagers that have an array of photosensors for detecting the light from a scintillator having a volume of material that converts x-ray energy into light. The light is to be transferred to the array of photosensors. To increase the efficiency of this transfer it is common to use a reflector on the scintillator side opposite of the photosensor array. Above and below the scintillator, there are layers of a variety of materials in the stack between the photosensor array and the reflector. Some of the layers are used for protection, others are glue for mechanical support and others are for optical matching between light transferring surfaces of the layers. Materials in these layers that are transparent to the light generated in the scintillator, can contribute to unwanted lateral light scattering, which degrades the spatial resolution of the imager. According to embodiments, any one, any combination, or all of the layers between the photosensor array and the reflector (e.g., other than the scintillator) may be a semi-transparent layer as that reduces later scattering and increase the spatial resolution of the imager.

BRIEF DESCRIPTION OF THE DRAWINGS

The embodiments of the invention are illustrated by way of example and not by way of limitation in the figures of the accompanying drawings in which like references indicate similar elements.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In some instances, well known components or methods have not been described in detail in order to avoid unnecessarily obscuring the present invention. Similarly, in some instances, well-known circuits, structures, and techniques have not been shown in detail so as not to obscure the understanding of this description.

Indirect conversion imagers suffer negative influences on image sharpness (e.g., resolution) due to lateral light scatter in layers between the scintillator and the photosensors. They also suffer negative influences on image sharpness due to the additional scattering of photons reflected by the reflector, back into the imager layers (e.g., other than the scintillator) between the reflector and the collector's photosensors. In these layers, materials transparent to the light, generated in the scintillator, may contribute to unwanted light scattering (e.g., across adjacent/neighboring photosensor distances) which degrades the spatial resolution or Modulation Transfer Function (MTF) of the imager (e.g., sharpness). For instance, the photons may scatter within material of the reflector, protective layers, glue, gels, and the like, which may be described herein as a "layer", a "first layer" or "layers" having a certain transparency with respect to light generated by the scintillator. This scattering may cause photons created by incident x-rays in the scintillator at a location above one photosensor to be received by another photosensor, thus, reducing image sharpness. For instance, the photons may scatter to a photosensor that is immediately adjacent the photosensor directly below the location, or to a photosensor even further away. Sharpness, spatial resolution, sensitivity and signal-to-noise ratios are important to successful operation of imagers.

Embodiments of the invention include indirect x-ray imagers, with a light transparency of layers that light generated by the scintillator goes through, to absorb most the lateral long range light, but not interfere with a normal (e.g., vertical) type of light propagation for a pixel or light detector. This includes the light transparency of layers above and/or below the scintillator, to light after it is generated by the scintillator and including the light reflected from a reflector layer. The light transparency of one, some, or all the layers which the light goes through, can be selected to meet certain lateral distance light transfer criteria or requirements, as described herein, to increase image sharpness and resolution. For instance, instead of being completely transparent, the light transparency of the layer(s) can be selected (e.g., "adjusted") to be semi-transparent or nominally-transparent to meet certain predetermined lateral distance light transfer criteria. Description herein of a "layer", a "first layer" or "layers" having a certain transparency (with respect to light generated by the scintillator) may exclude the transparency of scintillator layer itself.

Figure 1A:
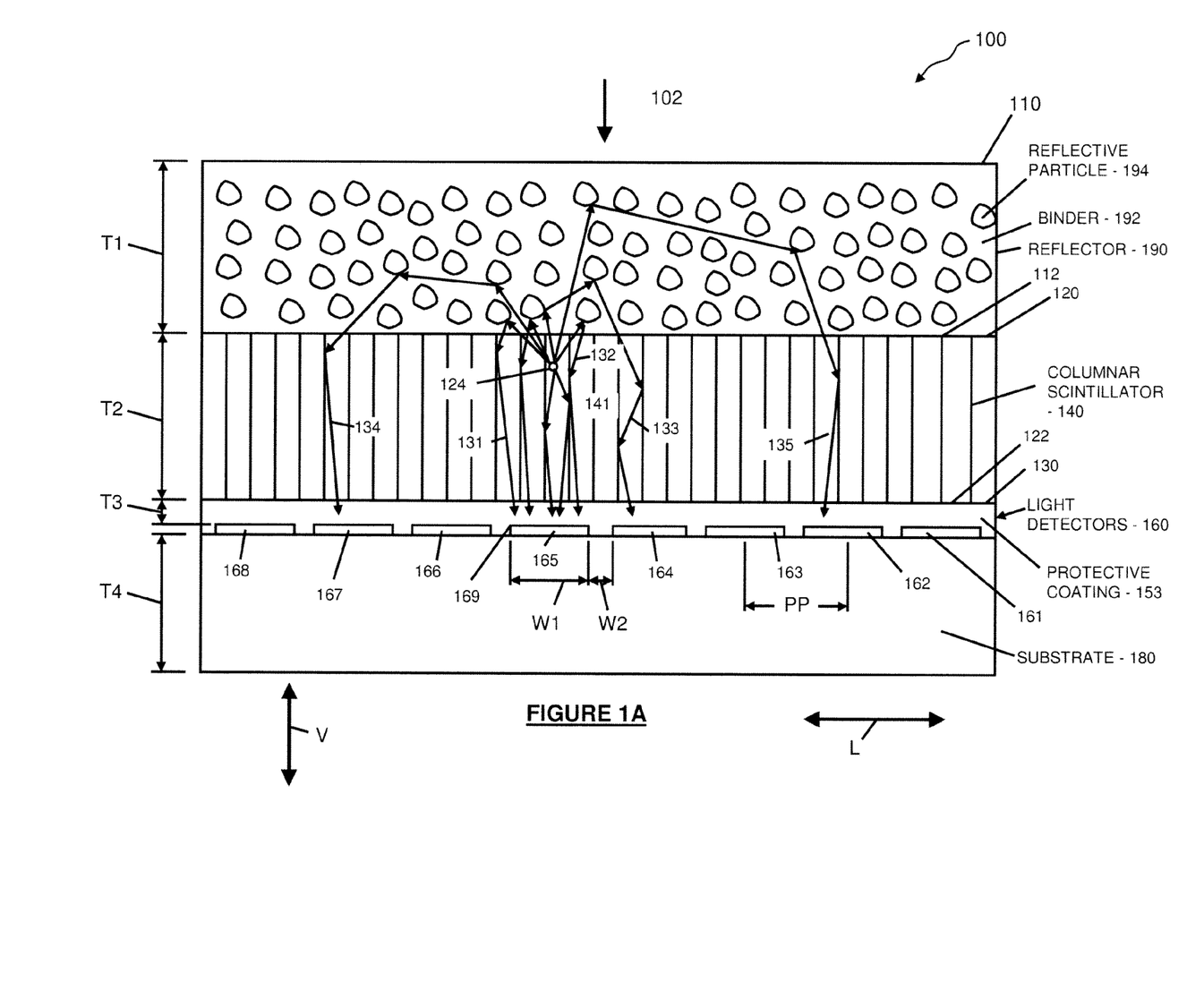
FIG. 1A illustrates one embodiment of an indirect x-ray imager having semi-transparent layers.
Figure 1B:
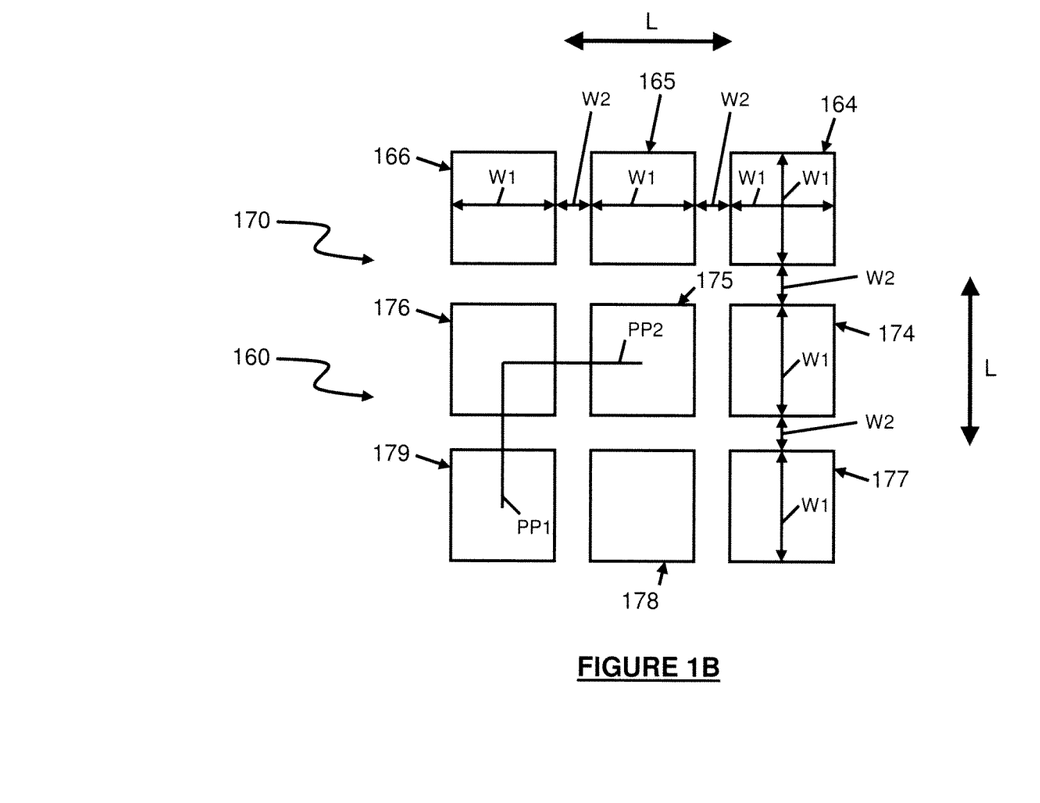
FIG. 1B illustrates the indirect x-ray imager of FIG. 1A from a top perspective.

For example, FIG. 1A illustrates one embodiment of an indirect x-ray imager having semi-transparent layers. FIG. 1B illustrates the indirect x-ray imager of FIG. 1A from a top perspective. FIG. 1A shows imager 100 having array 170 of light detectors 160 on substrate 180. Array 170 of light detectors 160 includes detectors 161, 162, 163, 164, 165, 166, 167, and 168. Light detectors 160 may be described as photo detectors, photosensors, and/or photo diodes. Various appropriate other known light sensors are also considered.

Herein, "above", "below" and/or "between" may refer to "vertical" direction V, as shown in FIG. 1A. Also, "horizontal" and/or "adjacent" may refer to lateral direction L, as shown in FIG. 1A and B.

Each of the light detectors has an approximate width, width W1. Width W1 may be an approximate width, an average width, and/or a design specification width across each light detector surface 169 facing the scintillator.

Width W2 is shown between the edges of adjacent or neighboring light detectors such as shown in FIG. 1B (e.g., between detectors 164 and 165). W2 may be an approximate width, an average width, and/or a design specification width between edges of adjacent detectors.

A "pixel pitch" may be defined as a distance between the centers of adjacent light detectors (e.g., adjacent photosensors or pixels). This center-to-center distance is shown as pitch PP between the center of photosensor 163 and 164 in FIG. 1A. Pixel pitch PP may be an approximate pitch, an average pitch, and/or a design specification center-to-center pitch of light detector surfaces 169 facing the scintillator. The center of a detector may be defined by an approximate center, an average center, and/or a design specification center location of light detector surfaces 169 facing the scintillator. In some cases, pitch PP may be described as W1 plus W2.

Pixel pitch PP is also shown by pitch length PP1 and pitch width PP2 in FIG. 1B. In this case, pitch length PP1 is equal to pitch width PP2. However, it can be appreciated that the pitch length and width may differ. In these cases, the descriptions herein may apply to either the pitch width or the length. FIG. 1A also shows protective coating 153 above detector 160. Scintillator 140 is shown on coating 153. Reflector layer 190 is shown formed on layer 140. Reflector 190 is a particle in binder (PIB) reflector having reflective particles 194 within binder 192. Reflector 190 has top surface 110, such as a surface which receives incident x-rays 102. In some embodiments, X-rays may be applied through the photodiodes. Here the X-rays may be incident into the bottom of substrate 180 in a direction opposite direction 102. These X-rays may be received at bottom surface 122 of scintillator layer 140, and converted by layer 140 into light (e.g., such as describe for X-rays 102).

According to embodiments, any one or more layers of an indirect imager (e.g., other than the scintillator), through which light generated in the conversion layer travels prior to being received by the light detectors, can be configured to be semi-transparent or nominally-transparent (e.g., to have a selected semi-transparency) to the generated light. For example, for embodiments of FIG. 1A, as described further below, layer 190 and/or coating 153 may be "semi-transparent" to light, to increase image sharpness and resolution. More generally, (e.g., for imagers 100, 200 and 300 herein) layers that can be semi-transparent include reflector layers (e.g., a particle-in-binder reflector), glue layers, gel layers, protective coatings, and protective layers. In some cases, semi-transparency or nominally-transparency is selected so that the aggregate of multiple layers provide the selected transparency and meet the lateral light transfer criteria or requirements. For some embodiments, a transparency of a layer can be "adjusted", "predetermined", "configured", or "selected" to be semi-transparent, as compared to being completely transparent across a lateral distance of that layer equal to a pixel pitch. A light transparency of any or all the layers above and/or below the scintillator can be selected or predetermined based on a material's known transparency or based on material's tested transparency with respect to the lateral light transfer criteria or requirements. Adjusting or selecting a light transparency may describe adding a coloring or dye to a completely transparent material of layer(s), so that the light transparency of the layer(s) becomes semi-transparent or nominally-transparent.

In some embodiments, a layer has a specific semi-transparency (e.g., the selected or adjusted transparency) across a lateral light detector or pixel pitch of the layer (e.g., as compared to being "completely" or 99 percent transparent across the pitch). Also, in some embodiments, a layer has a specific semi-transparency (e.g., the selected or adjusted transparency) through a layer, first layer or multiple layer vertical thickness (e.g., as compared to being "completely" or 99 percent transparent through the thickness). For example, the light transparency can be a pre-determined percentage for a layer(s) (e.g., determined by testing various materials in the layer(s)) in a range of between 80-99 percent opaque (e.g., 1-20 percent transparent) for a lateral distance of 1 pixel pitch or greater; and a pre-determined percentage in a range of between 50-99 percent transparent for a vertical distance of the thickness of the layer(s). These percentages may, cause 80-99 percent of light generated above one pixel of the scintillator not to make it farther than one pixel pitch in lateral distance (e.g., not to make it farther than to one adjacent or neighboring pixel); and cause 80-99 percent of the light to stay within the boundary of a pixel In some cases, the light transparency can be 95 percent opaque (e.g., 5 percent transparent) for a lateral distance of 1 pixel pitch or greater; and 97 percent transparent for a vertical thickness of the layer(s) the light travels after being generated in the conversion layer and prior to being received by the light detectors. For example, this will cause 95 percent of scintillator generated light not to scatter farther than one pixel pitch in lateral distance; and 97 percent of scintillator generated light will stay within the same pixel boundary.

Now describing various embodiments in more detail. FIG. 1A shows array 170 of light detectors 160 formed on (e.g. touching) substrate 180. Substrate 180 may have a thickness of T4 of between 100 and 2000μ. A few example materials for the substrate are glass, plastic, and silicon.

Light detectors 160 include detectors (e.g., pixels) 161, 162, 163, 164, 165, 166, 167, and 168. It can be appreciated more light detectors than those shown may exist in as detectors 160. For example, detectors 160 may represent a 2 dimensional array or grid of millions of similarly shaped pixels (e.g., square or rectangular). For instance, FIG. 1B shows array 170 of light detectors 160. Array 170 includes pixels 164, 165 and 166 across an upper row. Array 170 includes pixels 174, 175 and 176 across a middle row; and pixels 177, 178 and 179 across a lower row. It can be appreciated that more pixels, such as millions, may be included in the array. Moreover, the array may have an overall square, rectangular, or other shape. FIG. 1B shows pitch PP as pitches PP1 and PP2 between adjacent detectors. For example, pixels 165, 174, 178, and 176 may be considered immediately adjacent to pixel 175.

In some embodiments, width W1 (e.g., of a detector or pixel) may be between 20 and 1000 microns (e.g., between 20 and 1000 E-6 meters). In some cases, width W1 may be approximately 200μ. In some cases, width W2 may be between 0 and 100μ. In some cases, width W2 may be approximately 10μ. Thus, in some embodiments, W1 may be approximately 200μ, and W2 may be approximately 10μ. In other embodiments, W1 may be approximately 400μ, and W2 may be approximately 20μ. In other embodiments, W1 may be approximately 100μ, and W2 may be approximately 50μ.

In some embodiments, pitch PP (e.g., of detectors or pixels) may be between 20 and 1000 microns (e.g., between 20 and 1000 E-6 meters). In some cases, pitch PP may be approximately 127μ. In some cases, pitch PP may be approximately 150μ, 200μ, or 210μ. For some embodiments, pixel pitch (e.g., step sizes) may be any of 50μ, 70μ, 83μ, 127μ, 139μ, 143μ, 194μ, 323μ, and 520μ. In other embodiments, it is considered that pitch PP may be a pitch between any of these numbers. Thickness T3 between top surface 169 of light detectors 160 and top surface 130 of coating 153 may be between 0.1 and 20μ.

Protective coating 153 is formed above detector 160. Coating 153 may be touching top surfaces and edges of detectors 160, as well as the top surface of substrate 180 between the detectors. In some cases, where coating 153 is completely (or highly) transparent, protective coating 153 may include or be made of PET or Parylene. Protective coating 153 may have a thickness of between 0.1 and 20μ. Protective coating 153 may be formed by PVD deposition, spraying, dipping, extrusion or other methods. According to other embodiments, as noted below, coating 153 may be formed of other materials and/or by other methods to be semi-transparent.

Scintillator 140 is shown on coating 153. For example, bottom surface 122 of scintillator layer 140 may be touching top surface 130 of coating 153. Scintillator layer 140 may be a scintillation layer for the conversion of X-rays into optical photons. Suitable materials for the scintillation layer are known from the state of the art and may comprise, for example, CsI:Tl, CsI:Na, GadOx, YAG, BGO, GSO, LSO, NaI:Tl and LuAP. Scintillator 140 may include or be formed completely of cesium iodide (CSI). The photons created by scintillator 140 may be described as green in color or as green light. However, other scintillator materials and photon colors are considered. Layer 140 may have thickness T2 of between 50 and 1000μ or more. Thickness T2 may be approximately 600μ.

As scintillator 140 emits the light into all directions, only a portion of the photons will reach the detectors 160 directly. In order to limit an unwanted lateral "spreading" or "scattering" of photons, the scintillator may be structured into columns or "light tubes". For example, scintillator 140 may be a columnar scintillator having columns such as column 141 may function as "light pipes" to provide reflective boundaries, within the columns or pipes, for light created within or received at a top or bottom surface of the scintillator. For example, photons 131-135 may be contained within the light pipes or columns of scintillator 140 due to boundaries of the columns reflecting the light, as shown.

Figure 2:
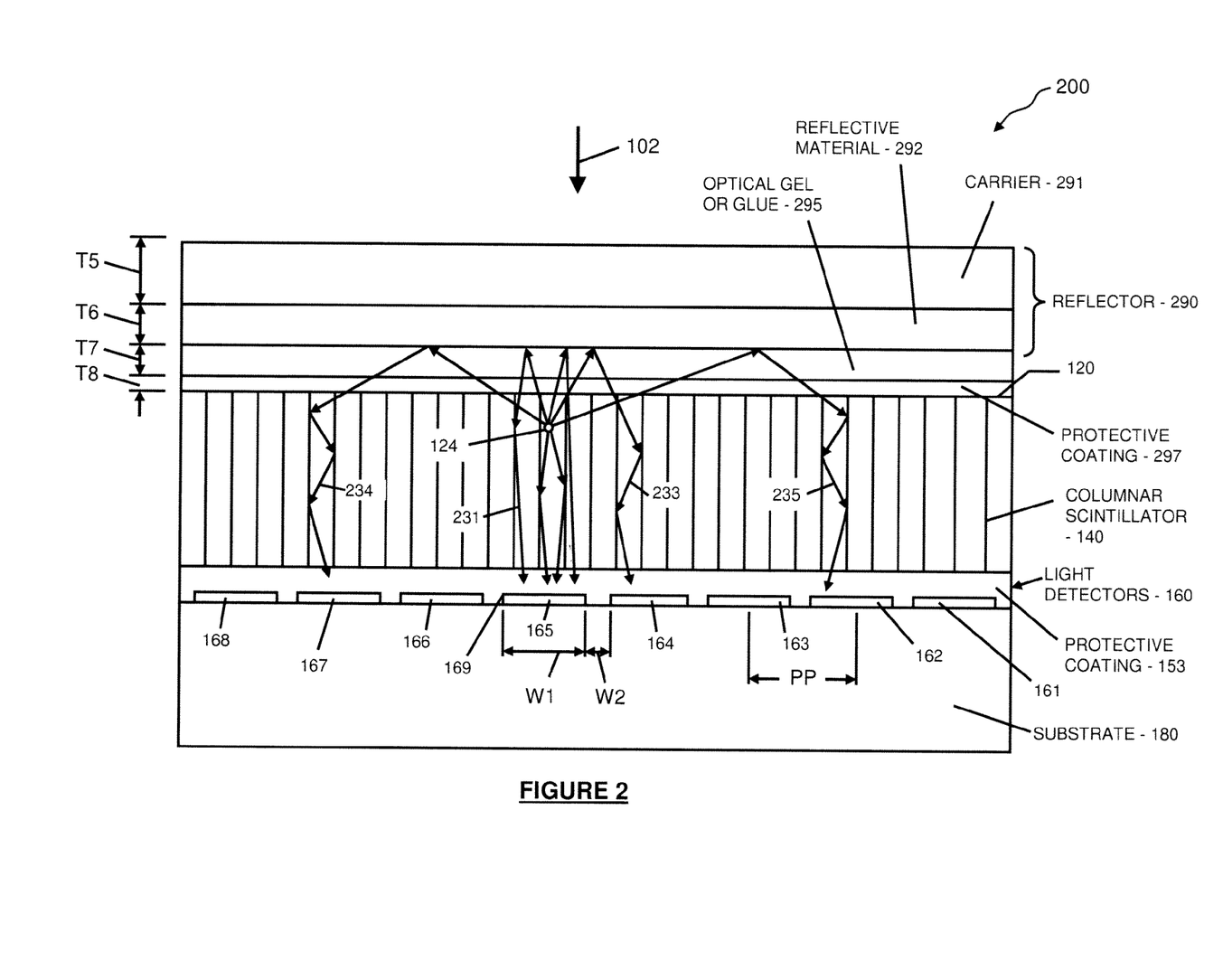
FIG. 2 illustrates one embodiment of an indirect x-ray imager having semi-transparent layers.
Figure 3:
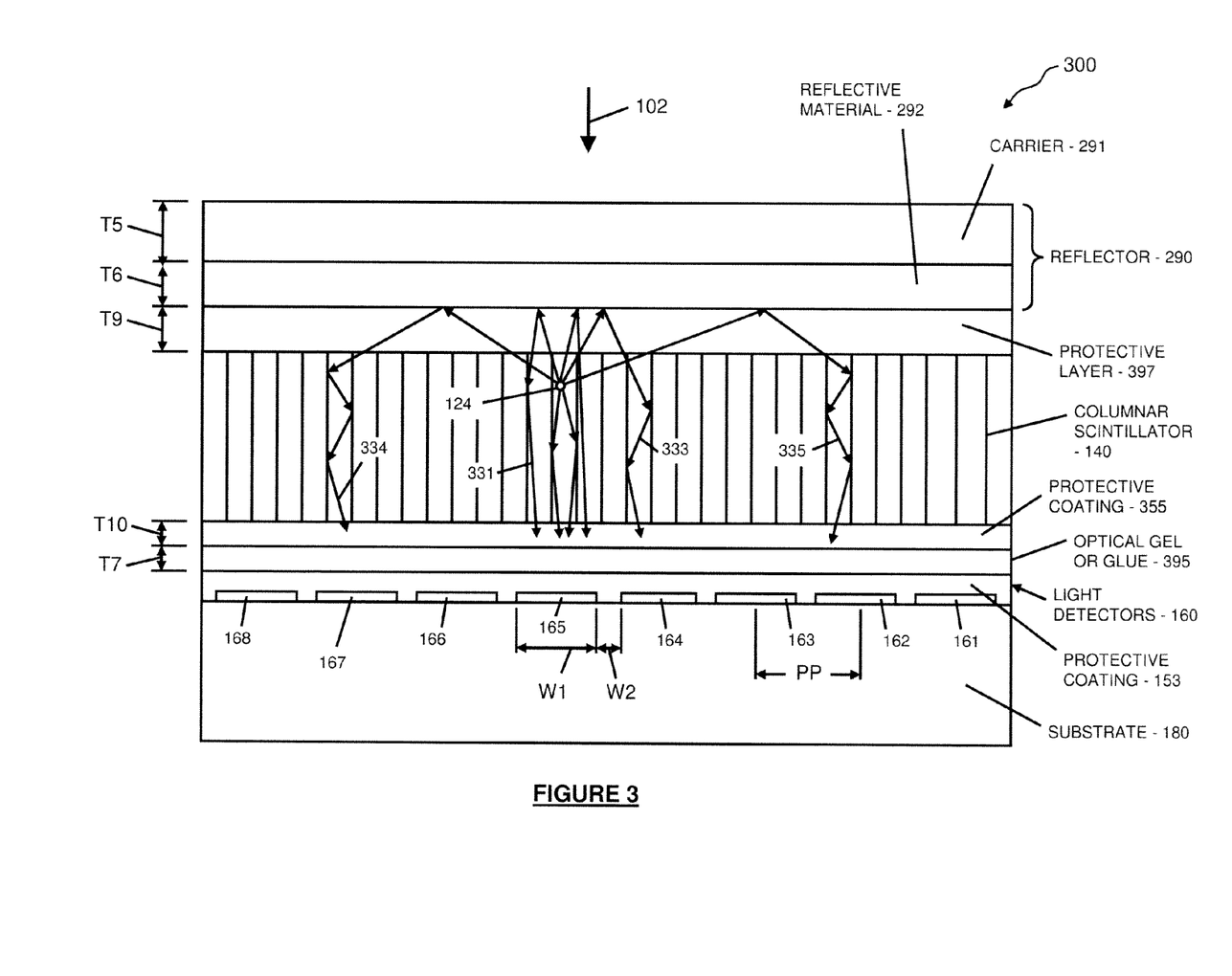
FIG. 3 illustrates one embodiment of an indirect x-ray imager having semi-transparent layers.

The scintillator material of layer 140 can be directly deposited on the array of photosensors (e.g., see FIGS. 1 and 2) or can be built as a separate sheet and attached to the array by different means (e.g., see FIG. 3). In some cases, scintillator 140 may be formed by growing crystal needles on a surface of the light detectors 160 (e.g., see FIGS. 1-2), of a reflector or of a protective coating (e.g., see FIG. 3). Columns of scintillator 140 may be formed by non-isotropic (e.g., anisotropic) growth of the material of the scintillator. For instance, scintillator 140 may be grown on surface 130 of coating 153.

Layer 190 may be a reflector that is arranged on or over the top surface of the scintillation layer 140 in order to reflect light photons back into the scintillation layer. In this way the light yield and with it the sensitivity and the signal-to-noise ratio of the imager can be increased. The reflector may be in direct contact to the scintillation layer or it may be separately coupled to the scintillation layer. The reflector may consist of one layer, more than one layer (e.g., with different functions), and/or a particle in binder (PIB) material. Reflector layer 190 is shown formed on (e.g. touching) layer 140. For instance, bottom surface 112 of layer 190 may be touching top surface 120 of layer 140. Layer 190 may have thickness T1 of between 50 and 1000μ. For instance, thickness T1 may be 200μ.

In this context, the "reflectivity" of a reflective layer herein may be defined as the percentage of light that is reflected by the object. A completely translucent object has for example a reflectivity of 0%, while a completely reflecting object has a reflectivity of 100%. Preferably the reflectivity of a reflective layer herein may be about 80% or more, most preferably by about 98% or more.

X-rays 102 may be provided by an x-ray source and may have previously traveled through an object and/or person, such as to image the object and/or person using imager 100. In some cases, reflector 190 may be completely transparent or semi-transparent to x-rays 102, so that x-rays 102 are received by surface 120 of scintillator 140, and travel through the volume of scintillator 140. It is also considered that x-rays (e.g., such as 102) may be received by to incident into the bottom of substrate 180 in a direction opposite direction 102. These X-rays may travel through and be converted by layer 140 (e.g., such as describe for X-rays 102). Within that volume, Scintillator 140 may convert a portion of, or most of the incident x-rays into photons of visible light that can be converted into electrical signals by detectors 160. For example, conversion 124 may describe a location where one x-ray photon (or more than one x-ray photon) is converted to one or more light photons. At conversion 124, x-rays 102 are converted by scintillator 140 into light photons the path of which is shown by the arrows pointing outwards from conversion 124. The photons include photons 131, 132, 133, 134, and 135 shown traveling through various layers of imager 100 and being received by detectors 160.

In more detail, for embodiments of FIG. 1A, reflector 190 is shown having reflective particles 194 within binder 192. Particles 194 may be formed of titanium oxide, magnesium oxide, aluminum oxide, and the like. Particles 194 may have a radius between 0.01 and 20μ. The size of particles 194 may be uniform, such as by being within 10 or 20 percent of an average diameter or have much wider distribution. Binder 192 may be formed of a plastic, a resin, an alkyd, or other material, which can be coated (e.g., including particles 194) onto surface 120 such as by brushing or spraying. For instance, reflector 190 may be an oil based paint (e.g., binder) including particles 194. In other cases, reflector 190 may be an acrylic or water based paint (e.g., binder) including particles 194.

According to embodiments, layer 190 (e.g., binder 192) may be "semi-transparent" to light (e.g., have selected or adjusted semi-transparency), such as described herein (e.g. for a "first layer"), to increase image sharpness and resolution. In some cases, binder 192 is semi-transparent or nominally-transparent material to light created by scintillator 140. For instance, binder 192 may be semi-transparent to the wavelengths of photons 131-135.

Now providing more particular definitions of "transparency" used herein. Herein, "transparency" or "transparent" may be used to describe an amount of transparency of a material to light across a lateral distance of a layer with respect to or based on lateral distance or width equal to (or a fraction of) a detector pitch PP (e.g., a pixel pitch). Also, "transparency" or "transparent" may be used to describe an amount of transparency of a material to light through a vertical distance of a layer or multiple layers' thickness. Transparency may be with respect to light that is produced or generated by the scintillator. In other embodiments, the transparency is with respect to light of one or more certain colors (e.g., green or blue) produced or generated by the scintillator.

For instance, "Completely transparent" may describe a light transparency of at least (e.g., equal to or greater than) 99 percent transparent (or optionally, above 90 percent transparent) across a lateral distance of a layer equal to 1.0 detector pitch PP, for the light wavelength produced by the scintillator. "Completely transparent" may also describe a light transparency of at least 99 percent transparent (or optionally, above 90 percent transparent) through a vertical distance of a layer or multiple layers' thickness, for the light wavelength produced by the scintillator.

"Semi-transparent" may describe a light transparency that is: (a) at least (e.g., more than or equal to) 80-99.99 percent transparent across the layer thickness (e.g., through a vertical distance of a layer or multiple layer's thickness), and (b) no more than (e.g., less than or equal to) 1-50 percent transparent across a lateral distance within a layer equal to 1.0 detector pitch PP. Semi-transparent may describe a light transparency that is less transparent than completely transparent. A semi-transparent layer may describe a "first layer" as described herein.

"Nominally-transparent" may describe a light transparency that is: (a) at least 95 percent transparent across the layer thickness, and (b) no more than 20 percent transparent across a lateral distance within a layer equal to 1.0 detector pitch PP. A nominally-transparent layer may describe a "first layer" as described herein. In some embodiments, nominal-transparency describes a transparency range or a percentage of transparency that is a subset or portion of a semi-transparency range.

For some embodiments, the transparency in vertical and lateral directions do not need to be complementary to 100%. For these embodiments, for any ratio between the vertical layer thickness and the pixel pitch there will be calculable ratios between the vertical and lateral transparencies.

According to embodiments, although some layers may be completely transparent, at least one layer through which light generated in the conversion layer (e.g., at conversion 124) travels prior to being received by the photo-detectors, is semi-transparent or nominally-transparent.

According to embodiments, coating 153 may be "semi-transparent" (or nominally-transparent) to light (e.g., have selected or adjusted semi-transparency), such as described herein (e.g. for a "first layer"), to increase image sharpness and resolution. Protective coating 153 may include or be made of a semi-transparent or nominally-transparent material to light created by scintillator 140. For instance, binder 192 may be semi-transparent to the wavelengths of photons 131-135. In these cases, coating 153 may not include PET or Parylene; and/or may not be PVD deposited. In these cases, coating 153 may be or may include organic materials, and/or polymers. In these cases, protective coating 153 may be formed by coating, such as described above for binder 192. In these cases, protective coating 153 may be formed by spraying, spinning, or dipping.

More generally, coating 153, and/or reflector 190, may be "semi-transparent" or nominally-transparent to light, to increase image sharpness and resolution. Thus, coating 153 may be semi-transparent, but binder 192 is completely transparent. Also, binder 192 may be semi-transparent, but coating 153 is completely transparent. In some embodiments, the aggregate of coating 153 and layer 190 are semi-transparent (e.g., to function as a semi-transparent layer or a "first layer") such as by both including sufficient semi-transparent material. For instance, a transparency of any one, or both of those layers (e.g., the aggregate thereof) may be selected to be semi-transparent or nominally transparent to meet certain predetermined lateral distance light transfer criteria as described herein.

Thus, in some cases, if photon 131 of FIG. 1A represents a photon that travels less than 0.1 pitch PP in lateral distance through binder 192, then for binder 192 being nominally transparent, at least 95 percent of photons such as photon 131 will survive transmission through binder 192. Alternatively, if photon 133 represents a photon that travels a lateral distance through binder 192 of 1.0 pitch PP then, for nominally transparent binder 192, only up to 20 percent of photons 133 will survive transmission through binder 192. Also, if photons 134 and 135 represent photons that travel greater in lateral distance through binder 192 than 1.0 pitch PP, for nominal transparent binder 192, only up to 20 percent of photons 134 and 135 will survive transmission through the binder.

Thus, in this case, most of the photons created in the scintillator will still reach the detector under which they are created, but only a small percent of them will be able to be transmitted farther than one detector away from the detector they are created over, thus increasing image sharpness and resolution, for a semi-transparent or nominally transparent binder. For example, while a high percentage of photons 131, 132 and 133 will survive, only a very small percentage of photons 134 and 135 will survive transmission through the binder.

According some embodiments, a protective layer exists between layer 190 and scintillator 140. In this case, the protective layer and/or reflector 190, may be "semi-transparent" or nominally-transparent to light, to increase image sharpness and resolution (e.g., such as noted above for coating 153, and/or reflector 190). These cases may optionally include coating 153 (e.g., the protective layer, coating 153 and/or reflector 190, may be "semi-transparent" or nominally-transparent to light as noted herein). This protective layer may be similar to layer 355 noted below for FIG. 3.

In some embodiments, scintillator 140 may be considered to be completely transparent to light. These exclude considering scintillator 140 as a "first" layer, or as part of an aggregate forming a "first" layer, to meet certain predetermined lateral distance light transfer criteria. Here, layer 140 is not considered relevant to those criteria.

In other embodiments, scintillator 140 is not considered completely transparent to light. In these cases, the transparency of layer 140 is considered for or calculated into the aggregate semi-transparency calculations for one or more layers selected to meet certain lateral distance transfer criteria as described herein. For example, experiments or tests can be performed to determine whether the aggregate of the semi-transparent or nominally transparent layer(s) noted herein (e.g., "first layers") along with the transparency and/or functionality of scintillator 140, meet the certain predetermined lateral distance light transfer criteria for the semi-transparent or nominally transparent layer noted herein.

FIG. 2 illustrates one embodiment of an indirect x-ray imager having semi-transparent layers. FIG. 2 shows imager 200 including scintillator 140 on light detectors 160, and light detectors 160 on substrate 180, such as described for FIGS. 1A-B. FIG. 2 also shows protective coating 297 formed on or touching top surface 120 of scintillator 140. Coating 297 may have a selected semi-transparency as described herein (e.g. for "a first layer"). Coating 297 may be of a material and/or formed of a process as described above for coating 153. Coating 297 may have thickness T8 such as a thickness between 0.1 and 20µ. Coating 297 may be formed by coating, such as described above for binder 192. In some cases, coating 297 may be formed by deposition, spraying, spinning, or dipping.

Next, FIG. 2 shows imager 200 including optical gel or glue 295 formed on (e.g. and touching) the top surface of coating 297. Glue 295 may be a glue or resin known in the art for bonding together layers of an imager, such as to bond a scintillator or protective layer to a reflective material or pre-fabricated reflective layer. For example, glue 295 may bond the bottom surface of reflector 290 to the top surface of coating 297. Glue 295 may have thickness T7, such as a thickness between 0.1 and 20µ. Glue 295 may be formed by coating, such as described above for binder 192. In some cases, glue 295 may be formed by dipping, spinning, spraying, using rollers, or by silkscreen.

Reflector 290 is shown having carrier 291 touching or bonded to non-light transparent reflective material 292. Reflector 290 may perform the function noted above for reflector 190 regarding reflecting light created by scintillator 140 back towards detectors 160. For example, carrier 291 may be a plastic or other material coated with reflective material 292. Material 292 may be a gold, silver, aluminum, other metals or alloys or other reflective coating as known in the art.

In some embodiments, glue 295 may be excluded, such as where reflector 290 is attached to scintillator 140 by pressure caused by other structures or atmospheric pressure pushing on substrate 180 and on carrier 291, holding those layers together. Carrier 291 may have thickness T5, such as a thickness between 50 and 2000µ; and material 292 may have a thickness such as between 1 and 500µ.

According to embodiments, coating 297, and/or glue 295, may be "semi-transparent" or nominally-transparent to light (e.g., have selected or adjusted semi-transparency), such as described herein (e.g. for a "first layer"), to increase image sharpness and resolution. Coating 297, and/or glue 295, may be semi-transparent or nominally-transparent material to light created by scintillator 140, such as by being semi-transparent to the wavelengths of photons 231-235. Thus, coating 297 may be semi-transparent, but glue 295 is completely transparent. Also, glue 295 may be semi-transparent, but coating 297 is completely transparent. In some embodiments, the aggregate of coating 297 and glue 295 are semi-transparent (e.g., to function as a semi-transparent layer or a "first layer") such as by both including sufficient semi-transparent material. For instance, a transparency of any one, or both of those layers (e.g., the aggregate thereof) may be selected to be semi-transparent or nominally transparent to meet certain predetermined lateral distance light transfer criteria as described herein.

Specifically, in some cases, if photon 231 of FIG. 2 represents a photon that travels less than 0.1 pitch PP in lateral distance (e.g., through coating 297, glue 295, or the aggregate thereof), then for coating 297, glue 295, or the aggregate thereof being nominally transparent, at least 95 percent of photons such as photon 231 will survive transmission (e.g., through coating 297, glue 295, or the aggregate thereof). Alternatively, if photon 233 represents a photon that travels a lateral distance (e.g., through coating 297, glue 295, or the aggregate thereof) of approximately 1.0 pitch PP then, for nominally transparent coating 297, glue 295, or the aggregate thereof, only up to 20 percent of photons 233 will survive transmission (e.g., through coating 297, glue 295, or the aggregate thereof). Next, if photons 234 and 235 represent photons that travel greater in lateral distance (e.g., through coating 297, glue 295, or the aggregate thereof), than 1.0 pitch PP, for nominal transparent coating 297, glue 295, or the aggregate thereof, only up to 20 percent of photons 234 and 235 will survive lateral transmission (e.g., through coating 297, glue 295, or the aggregate thereof).

Thus, in this case, most of the photons created in the scintillator will still reach the detector under which they are created, but only a small percent of them will be able to be transmitted farther than one detector away from the detector they are created over, thus increasing image sharpness and resolution, for a semi-transparent or nominally transparent coating 297, glue 295, or the aggregate thereof. For example, while a high percentage of photons 231, 232 and 233 will survive, only a very small percentage of photons 234 and 235 will survive lateral transmission through coating 297, glue 295, or the aggregate thereof.

FIG. 3 illustrates one embodiment of an indirect x-ray imager having semi-transparent layers. FIG. 3 shows imager 300 including substrate 180 and light detectors 160 as described for FIGS. 1A-B. FIG. 3 also shows scintillator 140 having a top surface on or touching a bottom surface of protective layer 397. Scintillator 140 may be formed or grown on layer 397. Layer 397 has a top surface on (e.g. touching) reflective material 292. Reflector 290 may function similarly to, be formed of material similar to, and be formed by processes similar to those described for layer 290 of FIG. 2. Layer 397 may be formed by deposition, growth, or coating (e.g., coating such as described above for coating 153, substrate 180, or binder 192). In some cases, layer 397 may be formed by spraying, spinning, or dipping.

FIG. 3 also shows scintillator 140 having a bottom surface on or touching a top surface of protective coating 355. Coating 355 has a bottom surface on (e.g. touching) optical gel or glue 395. Coating 355 may have thickness T10, such as a thickness between 1 and 20μ. Coating 355 may be formed by coating, such as described above for binder 192. In some cases, coating 355 may be formed by spraying, spinning, or dipping.

FIG. 3 also shows optical gel or glue 395 bonding the bottom surface of coating 355 to the top surface of coating 153. Glue 395 may be a material, have a thickness, and function similar to the description of glue 295 of FIG. 2. Glue 395 may have thickness T7, such as a thickness between 1 and 20μ. Glue 395 may be optional, as described for glue 295. Glue 395 may be formed by coating, such as described above for glue 295. In some cases, glue 395 may be formed by spraying, spinning, or dipping.

It is considered that glue 395, coating 355, and/or layer 39 may be "semi-transparent" or nominally-transparent to light (e.g., have selected or adjusted semi-transparency), such as described herein (e.g. for a "first layer"), to increase image sharpness and resolution. Glue 395, coating 355, and/or layer 39, may be semi-transparent or nominally-transparent material to light created by scintillator 140, such as by being semi-transparent to the wavelengths of photons 331-335. Thus, only one of glue 395, coating 355, and layer 397 may be semi-transparency, but the other two are completely transparent. In some embodiments, the aggregate of any combination of any two, or all three of glue 395, coating 355, and layer 397 are semi-transparency (e.g., to function as a semi-transparent layer or a "first layer") such as by both including sufficient semi-transparent material. For instance, a transparency of any one, combination of more than one (e.g., the aggregate thereof), or all of those layers (e.g., the aggregate thereof) may be selected to be semi-transparent or nominally transparent to meet certain predetermined lateral distance light transfer criteria as described herein (e.g., while the other layers are completely transparent).

For instance, in some cases, if photons 331 of FIG. 3 represents a photon that travels less than 0.1 pitch PP in lateral distance (e.g., through one of, any combination of or all of glue 395, coating 355, and layer 397), then for one of, any combination of or all of glue 395, coating 355, and layer 397 being nominally transparent, at least 95 percent of photons such as photon 331 will survive transmission (e.g., through one of, any combination of or all of glue 395, coating 355, and layer 397). Alternatively, if photon 333 represents a photon that travels a lateral distance (e.g., through one of, any combination of or all of glue 395, coating 355, and layer 397) of approximately 1.0 pitch PP then, for nominally transparent one of, any combination of or all of glue 395, coating 355, and layer 397, only up to 20 percent of photons 333 will survive transmission (e.g., through one of, any combination of or all of glue 395, coating 355, and layer 397). Finally, if photons 334 and 335 represent photons that travel greater in lateral distance (e.g., through one of, any combination of or all of glue 395, coating 355, and layer 397), than 1.0 pitch PP, for nominal transparent one of, any combination of or all of glue 395, coating 355, and layer 397, only up to 20 percent of photons 334 and 335 will survive transmission (e.g., through one of, any combination of or all of glue 395, coating 355, and layer 397).

Thus, in this case, most of the photons created in the scintillator will still reach the detector over which they are created, but only a small percent of them will be able to be transmitted farther than one detector away from the detector they are created over, thus increasing image sharpness and resolution, for a semi-transparent or nominally transparent one of, any combination of or all of glue 395, coating 355, and layer 397. For example, while a high percentage of photons 331, 332 and 333 will survive, only a very small percentage of photons 334 and 335 will survive transmission through one of, any combination of or all of glue 395, coating 355, and layer 397.

In some additional embodiments, reflector 290 may represent a reflective substrate upon which scintillator 140 is formed or grown, similar to the description of growing scintillator 140 on light detectors 160 of FIG. 1. In these cases, reflector 290 of FIG. 3 is replaced by a structure similar to reflector 190 of FIG. 1, where reflector 190 is a reflective particle 194 in plastic material. The binder being a plastic substance having semi-transparent or nominally transparent material, such as described for layer 153 or 297. Thus, instead of reflector 290, scintillator 140 is formed on a structure that looks like reflector 190 but has a semi-transparent or nominally transparent plastic in place of binder 192. In this case, the aggregate of semi-transparency of that reflector, layer 397, coating 355, coating 153, and optionally glue 395 are selected to provide the predetermined lateral distance light transfer criteria requirements. For the embodiment having plastic instead of binder 192, the reflector used for reflector 190 may be a prefabricated plastic carrier with particles.

More generally, according to embodiments, any one, any combination, or all of the following layers may be a "first layer", a semi-transparent layer, and/or a nominally transparent layer:

1. A Reflective coating with reflective particles in binder, with the binder having controlled light semi-transparency adjusted depending on the distance between the photosensors and the ratio between the amounts of reflective particles and the binder or the distance between the reflective particles (e.g., see FIG. 1A).
2. A Pre-manufactured reflector attached to an x-ray scintillator using a substance that has light semi-transparency adjusted depending on the distance between the photosensors and the distance between the scintillator and the reflector (e.g., see FIG. 2).
3. A Protective coating used on photosensors, scintillators or reflectors, having light semi-transparency adjusted depending on the distance between the photosensors and the thickness of the coating (e.g., see FIG. 3).
4. A reflective substrate for x-ray scintillator, made with reflective particles in binder (plastic), with the binder having controlled light semi-transparency adjusted depending on the distance between the photosensors and the ratio between the amounts of reflective particles and the binder or the distance between the reflective particles (e.g., see FIG. 3).
5. An X-ray scintillator attached to an array of photosensors with a substance that has light semi-transparency adjusted depending on the distance between the photosensors and the distance between the scintillator and the photosensors.

More specifically, in some embodiments, a "first layer" may be a material having a light transparency configured to (e.g., selected or adjusted to) reduce lateral scattering of the light (as compared to a material completely transparent to the light) by at least 80 percent at a lateral distance of one photosensor pitch, and by up to 20 percent at a vertical distance of a layer or multiple layer's thickness through which the light travels after generation and before detection. In some embodiments, a "first layer" may have a light transparency of not more than 20 percent at a lateral distance of one photosensor pitch, and at least 50 percent at a vertical distance equal to a thickness of the first layer. This may be due to the "first layer" material having a light transparency configured to (e.g., selected or adjusted to reduce lateral scattering of the light as compared to a material completely transparent to the light) of no more than 20 percent at a lateral distance of one photosensor pitch, and of at least 50 percent at a vertical distance of the "first layer" (e.g., a layer or multiple layer's thickness through which the light travels after generation and before detection).

In some embodiments, a "first layer" may be a material having a light transparency that is proportional to the photosensor pitch (e.g., PP), and is proportional to a thickness of the first layer (e.g., T1, T3, T7, T8, T9 and/or T10). For example, "proportional to" may describe a transparency that increases proportionally with an increase in the factors (e.g., pitch and/or thickness) it is "proportional to." That is, the transparency does not change after selection or during imager use. Instead, during design or manufacture of the imager, the transparency is configured, selected or adjusted to be greater in amount based on or calculated according to the amount (e.g., increase) in pitch and/or thickness. It can be appreciated that this concept applies to embodiments below, as well.

In some cases, a "first layer" may be a material having a light transparency that is proportional to a lateral distance between centers of neighboring photosensors (e.g., W1), and to a vertical distance between the first layer and the array of photosensors (e.g., a vertical distance from a bottom surface of the first layer to the top surface 169 of a detector). Moreover, in some cases, a "first layer" may be a material having a light transparency that is an optimum transparency to minimize lateral scattering of the light across a distance equal to the aggregate of one photosensor pitch and to maximize light transfer from the conversion layer to the array of photosensors. Furthermore, a "first layer" may be a material having a light transparency that is proportional a ratio between the volume of reflective particles and a volume of the binder. In some cases, a "first layer" may be a material having a light transparency that is proportional to an average distance (lateral or vertical) between the reflective particles. In some embodiments, a "first layer" may be a material having a light transparency that is proportional both the ratio and the average distance. In some embodiments, a "first layer" may be a material having a light transparency that is proportional a vertical distance between a top surface of the conversion layer and a bottom reflective layer. In some cases, a "first layer" may be a material having a light transparency transmitting most but not more than 99 percent of the light through a first layer, and reducing lateral scattering of most of the light from scattering more than one photosensor pitch, as compared to transmitting all or 99 percent of the light through the first layer.

It is considered that the semi-transparent or nominally transparent layers can be formed of various materials having known transparencies or tested transparencies (e.g., tested to meet the criteria noted above). In some cases, the semi-transparent or nominally transparent material may be formed of a completely transparent material which is dyed or altered. For instance during or after formation, a completely transparent material may be mixed with, infused with, coated with, or doped with a dye. In some cases, the dye may be a dye used to dye organic materials as gasoline or petroleum products. For example, binder 192, or any of the semi or non-transparent layers may be a completely transparent material mixed with a red dye, such as Aldrich Dye. The dye may be dissolved in a liquid or other substance that is used to form the binder or layer prior to formation or deposition of the binder or layer. For instance, a red or other color dye may be added to an oil based paint having binder 192. Particles 194 may exist in or be added to the paint. The paint may be any of various colors, including white. It is considered that other paints such as acrylic or water based paints can be used with appropriate dyes.

According to embodiments, top (e.g., upper) and bottom (e.g., lower) surfaces of the layers described for FIGS. 1-3 above (and of detectors 160) may be planar surface or nearly planar surface such as formed by deposition, coating, planarizing (e.g., chemical mechanical planarizing), forging, and/or rolling of materials.

Figure 4:
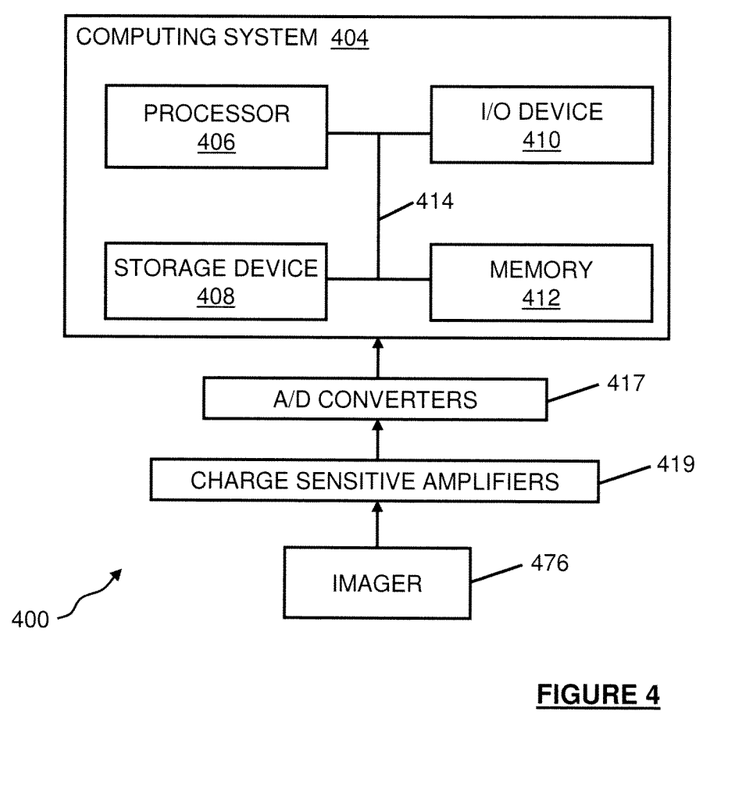
FIG. 4 illustrates one embodiment of an indirect x-ray imager system.

FIG. 4 illustrates one embodiment of an x-ray radiation detection system. X-ray detection system 400 includes a computing device 404 coupled to a flat panel imager 476. Flat panel imager 476 may operate by accumulating charge at light detectors 160 (e.g., pixels) of photodetector 100, 200 or 300. The charge may be generated and collected by the light detectors over time and depending on the amount of light generated by the coversion layer that is received by each detector. Typically, many pixels (e.g., light detectors) are arranged over a surface of flat panel imager 476 where, for example, switches (e.g., TFTs) at each pixel connect a light detectors to charge sensitive amplifier 419 at the appropriate time (e.g., using a dataline). For example, all of the pixels of a row of array 170 (e.g., pixels 161-168) may be read out at one time using a row driver to energize a row line of switches. In some cases, all of the row lines of the array may be energized by row drivers to read out all of the pixels of the array at one time, to form an image. The switches may be described as an array of switches to switch between causing the photosensors to collect the charges and causing the photosensors to switch out the collected charges. A computer may be coupled to the switches to cause the switches to perform such switching. The computer may also receive and display the image.

In one embodiment, an x-ray imager 476 may be constructed, for example, as a flat panel imager with a matrix (e.g., array 170) of one or more light detectors 160 with readout electronics to transfer the photon (e.g., x-ray) intensity of a pixel to a digital signal for processing. The readout electronics may be disposed around the edges of the imager to facilitate reception of incident x-rays on either surface of the imager.

The flat panel imager may use, for example, a TFT switch matrix coupled to the imager and light detectors 160 to collect and switch out charges produced in array 170. The charges are collected, amplified and processed, such as by system 400. Charge sensitive amplifier 419 drives analog to digital (A/D) converter 417 that, in turn, converts the analog signals received from amplifier 419 into digital signals for processing by computer device 404. A/D converter 417 may be coupled to computing device 404 using, for example, I/O device 410 or interconnect 414. A/D converter 417 and charge sensitive amplifiers 419 may reside within computing device 404 or flat panel imager 476 or external to either device. Amplifiers 419 integrate the charges accumulated in the pixels of the flat panel imager 476 and provide signals proportional to the received x-ray dose. Amplifiers 419 transmit these signals to A/D converter 417. A/D converter 417 translates the charge signals to digital values that are provided to computing device 404 for further processing. Although the operation of switch matrix may be discussed herein in relation to a TFT matrix, such is only for ease of discussion. Alternatively, other types of switch devices, such as switching diodes (e.g., single and/ or double diodes) may also be used. In some cases, system 400 may be described as a system for reducing light transfer or scattering between photosensors (adjacent) of array 170 of photosensors 160 of imager 100, 200 and/or 300. Components of system 400 (e.g., device 404) may be described as a computer a computer to convert the charges (e.g., generated by detectors 160) into x-ray images.

By including one, any combination of, or all of the layers described herein as a "first layer" or being semi-transparent, the imager may reduce, minimize or overcome the negative influences of scintillator 140 emitting the light uniformly into all directions, and/or of the reflector's effect on image sharpness (e.g., resolution) due to the scattering of reflected photons in the imager layers above the photosensors. For instance, the semi-transparent layer(s) reduce, minimize or overcome lateral photons scattering within material of the reflector, protective layers, glue, gels, and the like. This reduces, minimizes or overcomes the scattering of photons created by incident x-rays in the scintillator above one photosensor, to adjacent photosensors, thus, increasing image sharpness. Sharpness, special resolution, sensitivity and signal-to-noise ratios are important to successful operation of imagers.

The x-ray imager and/or system disclosed herein may be used in several important applications. Such applications include CT, cone beam CT, kV and MV imaging of patients, anatomy and cancer tumors. Such imaging may be performed during treatment, treatment planning, treatment simulation, treatment setup and treatment verification. For instance, x-ray imagers, such as described herein may be used to provide CT images (e.g., from kV source) used to generate or modify a treatment plan. They may also be used to provide CT images used during treatment simulation or treatment, such as to position a patient.

It should be noted that references to "an" or "one" embodiment of the invention in this disclosure are not necessarily to the same embodiment, and they mean at least one. The terms "top", "bottom", "front", "back", "above", "below", "upper", "over", "under", "middle", "lower", and "between" as used herein refer to a relative position of one layer or component with respect to another in a particular orientation as illustrated but do not imply any absolute orientation in space. Moreover, one layer deposited or disposed above or below another layer, or between layers, may be directly in contact with (e.g., touching) the other layer(s) or may have one or more intervening layers. The term "coupled" as used herein means connected directly to or connected indirectly through one or more intervening layers or operatively coupled through non-physical connection (e.g., optically).

The foregoing description of embodiments of the invention has been presented to illustrate the principles of the invention and not to limit the invention to the particular embodiment illustrated. It will, however, be evident that various modifications and changes may be made thereto without departing from the broader spirit and scope of embodiments of the present invention. For instance, X-ray imager devices, methods of imager fabrication, methods of imager use, means for performing imager functions, imager systems, and other uses of the imager technologies described herein are considered as possible embodiments of the invention. Moreover, the foregoing materials are provided by way of example as they represent the materials used in semi-transparent layers. It will be appreciated that other semi-transparent layer materials; or other materials or dyes may be used for the semi-transparent layers. The present specification and figures are accordingly to be regarded as illustrative rather than restrictive. It is intended that the scope of the invention be defined by all of the embodiments encompassed within the following claims and their equivalents.

What is claimed is:

1. An x-ray imager comprising:
   a conversion layer to convert incident x-rays into light;
   an array of photosensors below the conversion layer to receive the light, wherein the photosensors have a photosensor pitch; and
   a first layer which at least a portion of the light will go through before being received by the array of photosensors, the first layer having a light transparency of not more than 20 percent at a lateral distance of one photosensor pitch, and at least 50 percent at a vertical distance equal to a thickness of the first layer, wherein the photosensor pitch is between 50 and 520 micrometers.

2. The x-ray imager of claim 1, wherein the light transparency is selected to have a first predetermined proportionality to the photosensor pitch and to the thickness of the first layer.

3. The x-ray imager of claim 2, wherein the light transparency is proportional to a lateral distance between centers of neighboring photosensors.

4. The x-ray imager of claim 3, wherein the light transparency is an optimum transparency to minimize lateral scattering of the light across a distance equal to the photosensor pitch and to maximize light transfer from the conversion layer to the array of photosensors.

5. The x-ray imager of claim 2, wherein the first layer is one of: a) above and touching a top surface of the conversion layer; b) below and touching a bottom surface of the conversion layer; and c) above and touching a top surface of the array of photosensors.

6. The x-ray imager of claim 5, wherein the conversion layer is an X-ray conversion columnar scintillator.

7. The x-ray imager of claim 2, wherein the first layer is a reflective layer disposed over and touching a top surface of the conversion layer, the reflective layer configured to reflect the light towards the array of photosensors.

8. The x-ray imager of claim 1, wherein the first layer is a reflective coating having reflective particles in a binder, the binder having the light transparency, wherein the light transparency is proportional a ratio between the volume of reflective particles and a volume of the binder.

9. The x-ray imager of claim 8 wherein the reflective particles are formed of one of titanium oxide, magnesium oxide, and aluminum oxide; wherein the reflective particles have a radius between 0.01 and 20μ; and wherein the reflective particles have a size within 10 or 20 percent of an average diameter.

10. The x-ray imager of claim 9, wherein the first layer includes a binder formed of one of a plastic, a resin, and an alkyd; wherein the first layer comprises one of an oil based paint, an acrylic paint and a water based paint including the binder and the reflective particles; and the first layer can be coated onto a surface by brushing or spraying.

11. The x-ray imager of claim 2, further comprising:
    a reflective layer disposed over a top surface of the conversion layer, the reflective layer configured to reflect the light towards the array of photosensors;
    wherein the first layer is an optical gel or glue bonding the reflective layer to a top surface of the conversion layer.

12. The x-ray imager of claim 2, wherein the first layer is a protective coating that is one of: a) on the array of photosensors, b) on a top surface of the conversion layer, c) on a bottom surface of a reflective material disposed over the conversion layer, and d) on a bottom surface of the conversion layer.

13. The x-ray imager of claim 2, further comprising:
    an optical gel or glue bonding the first layer to a top surface of the conversion layer, wherein the first layer is a reflective substrate configured to reflect the light towards the array of photosensors using reflective particles in a plastic binder, wherein the binder has the light transparency.

14. The x-ray imager of claim 13, wherein the light transparency of the binder is proportional to a ratio between the volume of reflective particles and a volume of the binder.

15. The x-ray imager of claim 2, wherein the first layer is an attachment layer of optical gel or glue on the photosensors of the array, and having the light transparency.

16. The x-ray imager of claim 2, wherein the array of photosensors are configured to convert the light into electrical charges used to create an image and to collect the charges; further comprising:
an array of switches coupled to the photosensors, the switches to cause the photosensors to collect or switch out the collected charges.

17. An apparatus for reducing light transfer or scattering between photosensors of an array of photosensors having a photosensor pitch, the apparatus comprising:
means for converting incident x-rays into light;
means for transmitting most but not more than 99 percent of the light through a first layer, and reducing lateral scattering of most of the light from scattering more than one photosensor pitch, as compared to transmitting all of the light through the first layer;
means for converting the light into electrical charges;
means for converting the collected charges into an image, wherein the means for transmitting is disposed above the means for converting incident x-rays into light with respect to the means for converting the light into electrical charges, wherein the photosensor pitch is between 50 and 520 micrometers.

18. The apparatus of claim 17, wherein the means for transmitting comprises a light transparency selected to have a first predetermined proportionality to a photosensor pitch of the means for converting the light into electrical charges, and comprises a light transparency is selected to have a second predetermined proportionality to a thickness of a first layer of the means for transmitting.

19. The apparatus of claim 18, wherein the means for transmitting comprises a light transparency proportional to a lateral distance between centers of neighboring photosensors of the means for collecting, and proportional to a distance between a first layer of the means for transmitting and an array of photosensors of the means for converting the light into electrical charges.

20. The apparatus of claim 18, wherein the means for transmitting comprises reflective layer disposed over and touching a top surface of the means for converting incident x-rays into light, the reflective layer configured to reflect the light towards an array of the photosensors.

21. The apparatus of claim 20, wherein the means for transmitting light comprises a reflective coating having reflective particles in a binder, the binder having the light transparency, wherein the light transparency is proportional to a ratio between the volume of reflective particles and a volume of the binder.

22. A system for reducing light transfer or scattering between photosensors of an array of photosensors having a photosensor pitch, the system comprising:
an x-ray imager comprising:
a first conversion layer to convert incident x-rays into light;
a first layer having a material that is not completely transparent to the light and that has a light transparency selected to reduce lateral scattering of most of the light from scattering more than one photosensor pitch, as compared to a material transparent to the light;
a second conversion layer below the first conversion layer and the first layer to receive the light, the second conversion layer including an array of photosensors to convert the light into an array of electrical charges used to create an image, wherein the first layer is disposed above the first conversion layer with respect to the second conversion layer, wherein the photosensor pitch is between 50 and 520 micrometers; and
a computer coupled to the photosensors, the computer to receive and display the image.

23. The system of claim 22, wherein the photosensors store the charge; and further comprising:
an array of switches coupled to the photosensors, the switches to switch between causing the photosensors to collect the charges and causing the photosensors to switch out the collected charges; and
wherein the computer is coupled to the switches, the computer to cause the switches to switch.

24. The system of claim 22, further comprising:
a carrier layer above the first conversion layer;
a reflective layer between the carrier layer and the first conversion layer.

25. An x-ray imager comprising:
a conversion layer to convert incident x-rays into light;
an array of photosensors below the conversion layer to receive the light, wherein the photosensors have a photosensor pitch; and
a first layer disposed above the conversion layer, the first layer having a light transparency configured to reduce lateral scattering of most of the light from scattering more than one photosensor pitch, as compared to a material completely transparent to the light, wherein the light transparency is proportional to the photosensor pitch, and is proportional to a thickness of the first layer, wherein the photosensor pitch is between 50 and 520 micrometers.

26. An x-ray imager comprising:
a conversion layer to convert incident x-rays into light;
an array of photosensors below the conversion layer to receive the light, wherein the photosensors have a photosensor pitch; and
a first layer which at least a portion of the light will go through before being received by the array of photosensors, the first layer having a light transparency of not more than 20 percent at a lateral distance of one photosensor pitch, and at least 50 percent at a vertical distance equal to a thickness of the first layer, wherein the first layer comprises a red dye and the light transparency is caused by the red dye.

* * * * *